(12) United States Patent
Harada

(10) Patent No.: US 8,421,791 B2
(45) Date of Patent: Apr. 16, 2013

(54) LIQUID CRYSTAL DISPLAY DEVICE

(75) Inventor: Kenji Harada, Ishikawa-ken (JP)

(73) Assignees: Kabushiki Kaisha Toshiba, Tokyo (JP); Japan Display Central Inc., Fukaya-shi (JP)

( * ) Notice: Subject to any disclaimer, the term of this patent is extended or adjusted under 35 U.S.C. 154(b) by 690 days.

(21) Appl. No.: 12/625,808

(22) Filed: Nov. 25, 2009

(65) Prior Publication Data

US 2010/0128019 A1    May 27, 2010

(30) Foreign Application Priority Data

Nov. 25, 2008    (JP) .................................. P2008-300006

(51) Int. Cl.
*G06F 3/038*    (2006.01)

(52) U.S. Cl.
USPC ............................................ 345/212; 345/98

(58) Field of Classification Search ........................ None
See application file for complete search history.

(56) References Cited

U.S. PATENT DOCUMENTS

| | | | | |
|---|---|---|---|---|
| 5,699,075 | A * | 12/1997 | Miyamoto | ....................... 345/97 |
| 5,801,672 | A | 9/1998 | Masuda et al. | |
| 6,107,983 | A | 8/2000 | Masuda et al. | |
| 6,831,617 | B1 * | 12/2004 | Miyauchi et al. | ............... 345/33 |
| 7,006,082 | B2 * | 2/2006 | Akai et al. | .................... 345/204 |
| 7,295,178 | B2 * | 11/2007 | Nakano et al. | .................. 345/98 |
| 7,538,753 | B2 * | 5/2009 | Tanada | ........................... 345/100 |
| 2006/0267889 | A1 * | 11/2006 | Kimura | ............................ 345/84 |
| 2007/0091050 | A1 * | 4/2007 | Katayama et al. | .............. 345/98 |
| 2008/0079680 | A1 * | 4/2008 | Fujita | .............................. 345/89 |
| 2009/0027318 | A1 * | 1/2009 | Murakami et al. | .............. 345/87 |

FOREIGN PATENT DOCUMENTS

| | | |
|---|---|---|
| JP | 6-202595 | 7/1994 |
| JP | 06202595 A * | 7/1994 |
| JP | 8-286170 | 11/1996 |
| JP | 2001-202053 | 7/2001 |
| JP | 2001-356746 | 12/2001 |
| JP | 2003-5727 | 1/2003 |
| JP | 2004-205725 | 7/2004 |

OTHER PUBLICATIONS

U.S. Appl. No. 12/609,889, filed Oct. 30, 2009, Harada.
Office Action issued Feb. 1, 2011 in Japan Application No. 2008-300006 (English Translation).

* cited by examiner

*Primary Examiner* — Jason Olson
(74) *Attorney, Agent, or Firm* — Oblon, Spivak, McClelland, Maier & Neustadt, L.L.P.

(57) ABSTRACT

A liquid crystal display device includes a plurality of pixels arranged on a substrate in a matrix, a source driver circuit to supply source signals to source lines connected to each pixel arranged in a column direction and a gate driver circuit to supply gate signals to respective gate lines connected to pixels arranged in a row direction. A control circuit outputs an array control signal for a partial display to a receiver circuit that receives a partial display start address to specify a gate line for starting a partial display and a partial display end address to specify a gate line for ending the partial display. A decoder circuit outputs a control signal to control a range of the gate lines driven by the gate driver circuit.

16 Claims, 9 Drawing Sheets

LIQUID CRYSTAL DISPLAY DEVICE

CROSS-REFERENCE TO RELATED APPLICATION

This application is based upon and claims the benefit of priority from prior Japanese Patent Application No. 2008-300006 filed Nov. 25, 2008, and the entire contents of which are incorporated herein by reference.

BACKGROUND OF THE INVENTION

1. Field of the Invention

The present invention relates to a liquid crystal display device having a plurality of display areas independently driven to show some pictures in a display panel.

2. Description of the Background Art

Liquid crystal display devices are widely used as typical display devices for various kinds of equipments such as personal computers, OA equipments, and TV sets because liquid crystal display devices have many advantages such as lightness, compactness and low power consumption. In recent years, mobile liquid crystal display devices for use in mobile terminal equipments such as a mobile phone, a car navigation device and a game player, and a large size display panel have had much demand. In order to meet such demand, compactness, low power consumption or use longevity have been requested. It is effective to lower the total power consumption of the display device in addition to achieve a high quality of a battery installed in the display device.

A liquid crystal display device that is capable of partially displaying pictures in one panel is known to achieve low power consumption. The partial display is a method to display a picture in a partial area of a panel, in which a plurality of display areas are formed in one panel and the display areas are independently driven. However, it is difficult to respond to a requirement that an arbitrary pattern is displayed in an arbitrary area.

Such a display device in which an arbitrary pattern is displayed in an arbitrary area and the power consumption is reduced when displayed is disclosed, for example, in Japanese patent applications No. 2001-356746 and No. 2003-5727.

However, in the above-noted liquid crystal display device, an exclusive gate driver IC and a source driver IC corresponding to the partial driving are required, and a development of a timing controller IC to conduct a partial driving to control the partial display is necessary. Further, the number of parts required to conduct partial driving increases. Consequently, according to the above technology, since a manufacturing cost increases with accompanying difficulty of forming the driving circuit in the array substrate, it is pointed out that it is difficult to advance SOG (System on Glass) technology and a narrow frame.

BRIEF SUMMARY OF THE INVENTION

The present invention has been made to address the above-mentioned problems. One object of this invention is to provide a low cost liquid crystal display device with a partial display function that advances SOG narrow frame technology.

Thus, according to one aspect of the invention, there is provided a liquid crystal display device, including: a plurality of pixels arranged on a substrate in a matrix; a source driver circuit to supply source signals to source lines connected to each pixel arranged in a column direction; a gate driver circuit to supply gate signals to gate lines connected to each pixel arranged in a row direction; a control circuit to output an array control signal for a partial display; a receiver circuit to receive a partial display start address to specify a gate line for starting a partial display and a partial display end address to specify a gate line for ending the partial display; a decoder circuit to output a control signal to control a range of gate lines driven by the gate driver circuit.

According to another aspect of the invention there is provided a method for displaying a partial picture in a liquid crystal display panel, including: outputting an array control signal for a partial display to a receiver circuit; retrieving a start gate address and an end gate address from the receiver circuit; decoding the start gate address and the end gate address to control a range to scan gate lines corresponding to a partial display area; selecting gate lines for the partial display by controlling switches on receiving results of the decoding; and supplying image data to the pixels selected by the gate lines to conduct a partial display.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
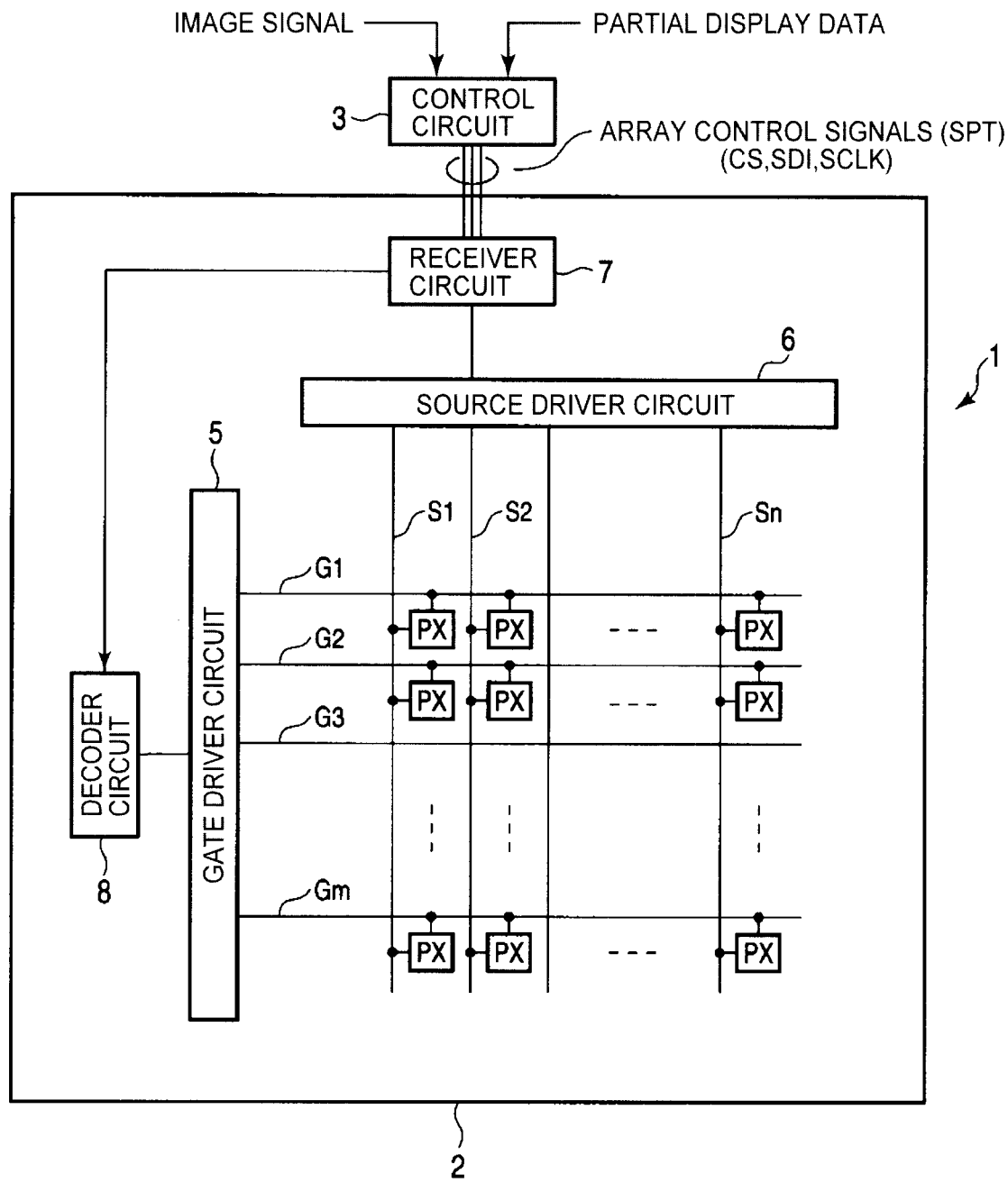
FIG. 1 is a schematic circuit diagram showing a liquid crystal device according to a first embodiment of the invention.

A liquid crystal display device according to an exemplary embodiment of the present invention, in particular, a liquid crystal display device having a plurality of display areas independently driven to show some pictures, called a partially driven displays, will now be described with reference to the accompanying drawings wherein the same or like reference numerals designate the same or corresponding parts throughout the several views.

Hereinafter, a liquid crystal display device according to a first embodiment will be explained referring to figures.

FIG. 1 is a schematic circuit diagram showing a liquid crystal device according to a first embodiment of the invention. As shown in FIG. 1, a liquid crystal display device includes a display panel 1 and a control circuit 3 to control the display panel 1. The display panel 1 is structured by interposing a liquid crystal layer between a pair of an array substrate 2 and a counter substrate (not shown). The display panel 1 includes m×n liquid crystal pixels arranged on the array substrate 2 formed of a transmissive insulating substrate such as a glass substrate, m gate lines G1~Gm arranged in every row lines of the liquid crystal pixels and n signal lines S1~Sn arranged in every column lines of the liquid crystal pixels. Further, the array substrate 2 includes a gate driver circuit 5 to control the gate lines G1~Gm, a source driver circuit 6 to control a driving of the signal lines S1~Sn, a receiver circuit 7 and a decoder circuit 8.

The control circuit 3 controls a transmission of the display panel 1 by controlling the liquid crystal display layer. The control circuit 3 outputs an array control signal for a partial display compliant to three line serial signals protocol (SPI: Serial Peripheral Interface) to the receiver circuit 7 and outputs various timing signals (not shown) to the gate driver circuit 5, the source driver circuit 6, the receiver circuit 7 and the decoder circuit 8.

The array control signal includes an address to select the gate lines G1~Gm and image data. The gate driver circuit 5 sequentially drives a plurality of gate lines G1~Gm. The gate driver circuit 5 is formed of, for example, shift registers to select the gate lines G. The source driver circuit 6 outputs pixel voltages Vs to respective source lines S1~Sn while the pixels arranged in one row line are selected by the corresponding gate line G. The receiver circuit 7 retrieves addresses and image data for the partial display from the array control line received from the control circuit 3, and then outputs the address to the decoder circuit 8. Further, the receiver circuit 7 outputs the image data to the source driver circuit 6.

The decoder circuit 8 generates a signal which specifies a range of the address lines driven by the gate driver circuit 5. The signal is formed of partial start address and partial end address that are specified by the partial display addresses from the receiver circuit 7. The gate driver circuit 5 drives the selected gate lines G and the source driver circuit 6 outputs the respective pixel voltage Vs that corresponds to the image data to the source lines S1~Sn in synchronism with the driving of the gate lines G.

Figure 2:
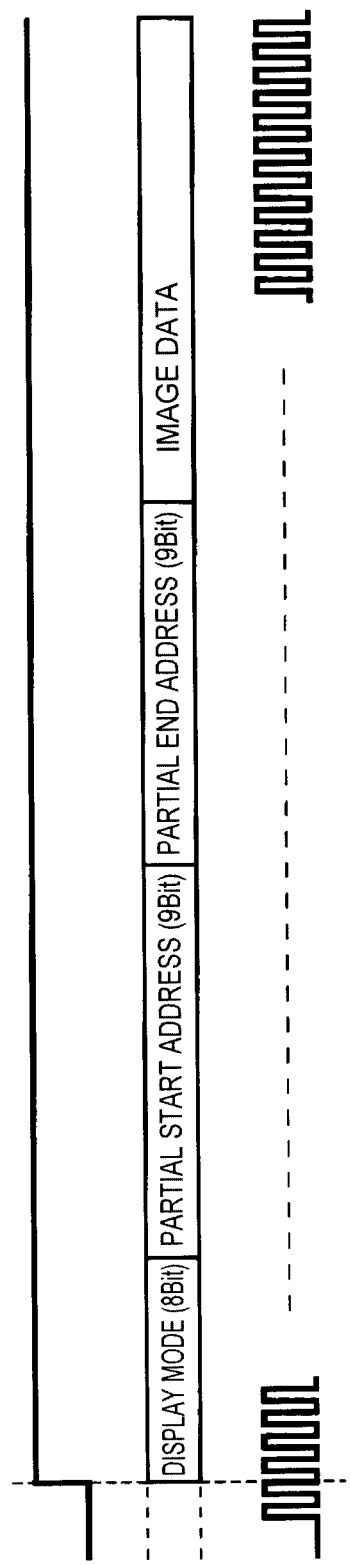
FIG. 2 is a block diagram showing array control signals shown in FIG. 1.

FIG. 2 is a diagram showing a content of the array control signal. As mentioned above, the array control signal is constructed by three control lines compliant to the three line serial signals protocol (SPI: Serial Peripheral Interface). A chip select signal (CS), a serial clock (SCLK) and a serial data (SDI) are assigned to respective three array control lines. While the chip select signal (CS) is "ON" state, the receiver circuit 7 processes the array control signals. The serial clock (SCLK) is a basic clock for processing of the array control signals.

The serial data (SDI) includes a display mode signal, a partial start address, a partial end address and image data, and is sequentially inputted to the receiver circuit 7 in synchronism with the serial clock (SCLK) as serial signals. The display mode signal is a signal used to judge a whole display or a partial display. The partial start address specifies an address of the gate line to start the partial display. On the other hand, the partial end address specifies the address of the gate line to terminate the partial display. The image data corresponds to the pixel voltages Vs written into the liquid crystal display pixel.

The control circuit 3 generates the display mode signal, the partial start address and the partial end address on receiving signals relating to the partial display from user operated equipment. The image data are generated by the control circuit 3 based on image signals inputted from outside. When the display mode signal is the partial mode, the serial data (SDI) includes the partial start address and the partial end address. On the other hand, when the display mode signal is a whole display mode, such partial addresses are not included in the serial data SDI. In this embodiment, although the display mode signal of 8 bits, the partial start address of 9 bits and the partial end address of 9 bits are used, the present invention is not limited to such bits construction and may use other bits construction.

Figure 3:
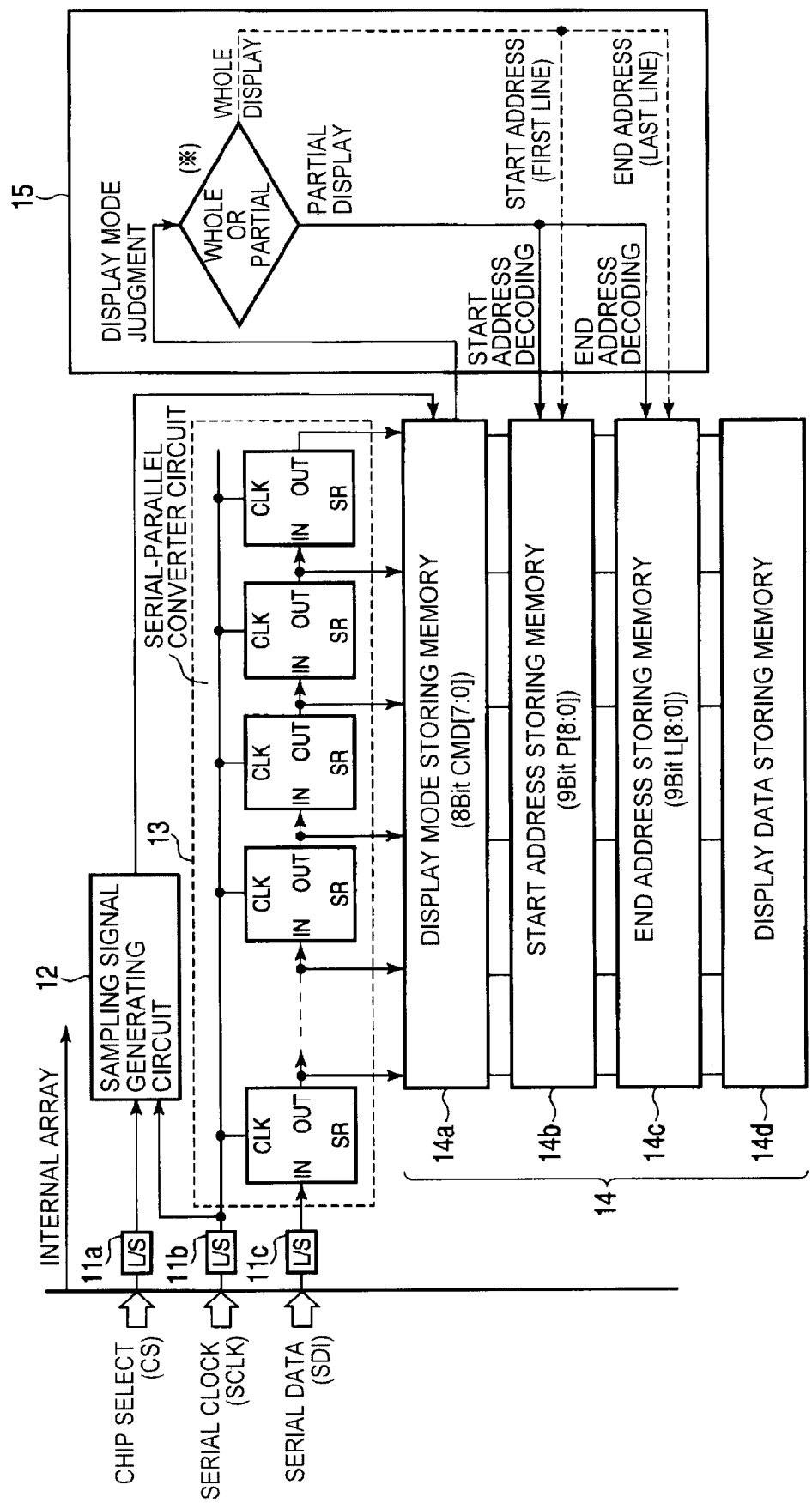
FIG. 3 is a diagram showing a construction and an operation of a receiver circuit shown in FIG. 1.

FIG. 3 is a diagram to explain construction and operation of the receiver circuit 7. The receiver circuit 7 is formed on the array substrate 2 and includes a level shifter 11 (11a, 11b, 11c), a sampling signal generating circuit 12, a serial-parallel converter circuit 13, a storing memory 14 (14a, 14b, 14c, 14d) and a partial display control circuit 15. The level shifter 11 converts signal levels of the array control signals. The serial-parallel converter circuit 13 sequentially receives and converts each data contained in the serial data (SDI) to parallel data, and outputs the converted data to the memory 14. The memory 14 includes a display mode memory 14a, a start address memory 14b, an end address memory 14c and a display data memory 14d to store each data contained in the serial data (SDI).

The sampling signal generating circuit 12 generates a timing signal that commands a timing when the data in the serial-parallel converter circuit 13 is transferred to the memory 14. The partial display control circuit 15 controls the whole storing operation. In FIG. 3, a process flow related to the partial start address and the partial end addresses are shown in a block of the partial control circuit 15.

Next, an operation of the receiver circuit 7 will be explained. The sampling signal generating circuit 12 starts an operation at the time when the chip select signal CS becomes "ON" state. The sampling signal generating circuit 12 and the serial parallel converter circuit 13 process using the serial clock (SCLK) as a basic clock.

The serial data (SDI) shifts in the shift registers SR that construct the serial-parallel converter circuit 13 in synchronism with the serial clock (SCLK). At the timing when a predetermined number of bits are inputted to the serial-parallel converter circuit 13, a timing signal is outputted from the sampling signal generating circuit 12. On receiving the timing signal, the data in the serial-parallel converter circuit 13 are written into the memory 14. For example, at the timing when the first 8-bits of the serial data (SDI) are inputted to the serial-parallel converter circuit 13, the first 8-bits are stored in the display mode memory 14a. Similarly, at the timing when successive 9-bits data of serial data (SDI) are inputted, the data are stored in the start address memory 14b. At the timing when successive 9-bits data of serial data (SDI) are inputted, the data are stored in the end address memory 14c. Finally, at the timing when a successive predetermined number of bits data of serial data (SDI) are inputted, the data are stored in the display data memory 14d.

The partial display control circuit 15 judges if the display is a whole display or a partial display by the stored data in the display mode memory 14a. When the display mode is a partial display, the partial start address and the partial end address become a start address and an end address, respectively in the display panel 1. Since, the partial display size may be different depending on the panel size, it is possible to convert the partial start address and the partial end address so as to conform to the panel size and store the converted addresses in the memories 14b and 14c by the partial control circuit 15.

The serial data (SDI) does not include the partial start address and the partial end address when the display mode is a whole display. Accordingly, in this case, the partial control circuit 15 stores an address of a first line of the display panel 1 in the start address storing memory 14b and stores the last line of the display panel 1 in the end address memory 14c. The decoder circuit 8 controls a scan range of the gate driver circuit 5 in accordance with the data stored in the start address memory 14b and the end address memory 14c.

Figure 4:
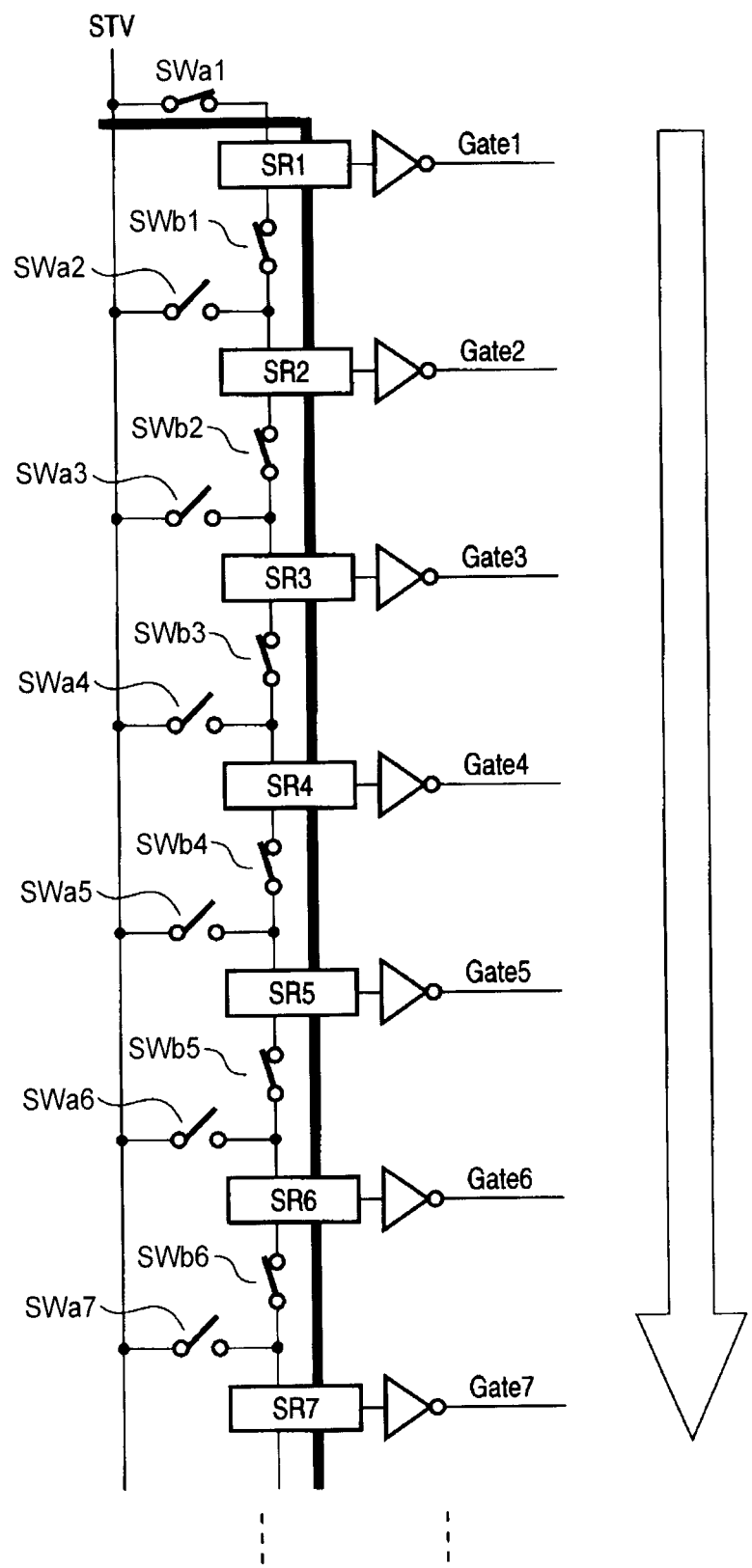
FIG. 4 is a view schematically showing a frame format of a signal connection between a decoder circuit and a gate driver circuit when a whole panel is displayed according to the first embodiment of the invention.

FIG. 4 is a schematic circuit diagram showing a signal connection of the decoder circuit 8 with the gate driver circuit 5 when a whole display is made. Shift registers (SR1, ... ), gate signal lines (Gate 1, ... ) and buffer circuits shown in FIG. 4 are provide in the gate driver circuit 5. A plurality of first switches (SWa1, ... ) and second switches (SWb1, ... ) are provided in the decoder circuit 8. When the display mode is a whole display, only one switch SWa1 is "ON" state among the first switches and remaining first switches (SWa2, ... ) are "OFF" state. All the second switches (SWb1 ... ) are "ON" state. A horizontal start pulse STV is inputted to a first shift register SR1 as shown in line highlighted in bold by switching the first switch SWa1 as mentioned-above, and the shift registers process the shift operation to the last shift register. Accordingly, a scan from the first gate line to the last gate line is made.

Figure 5:
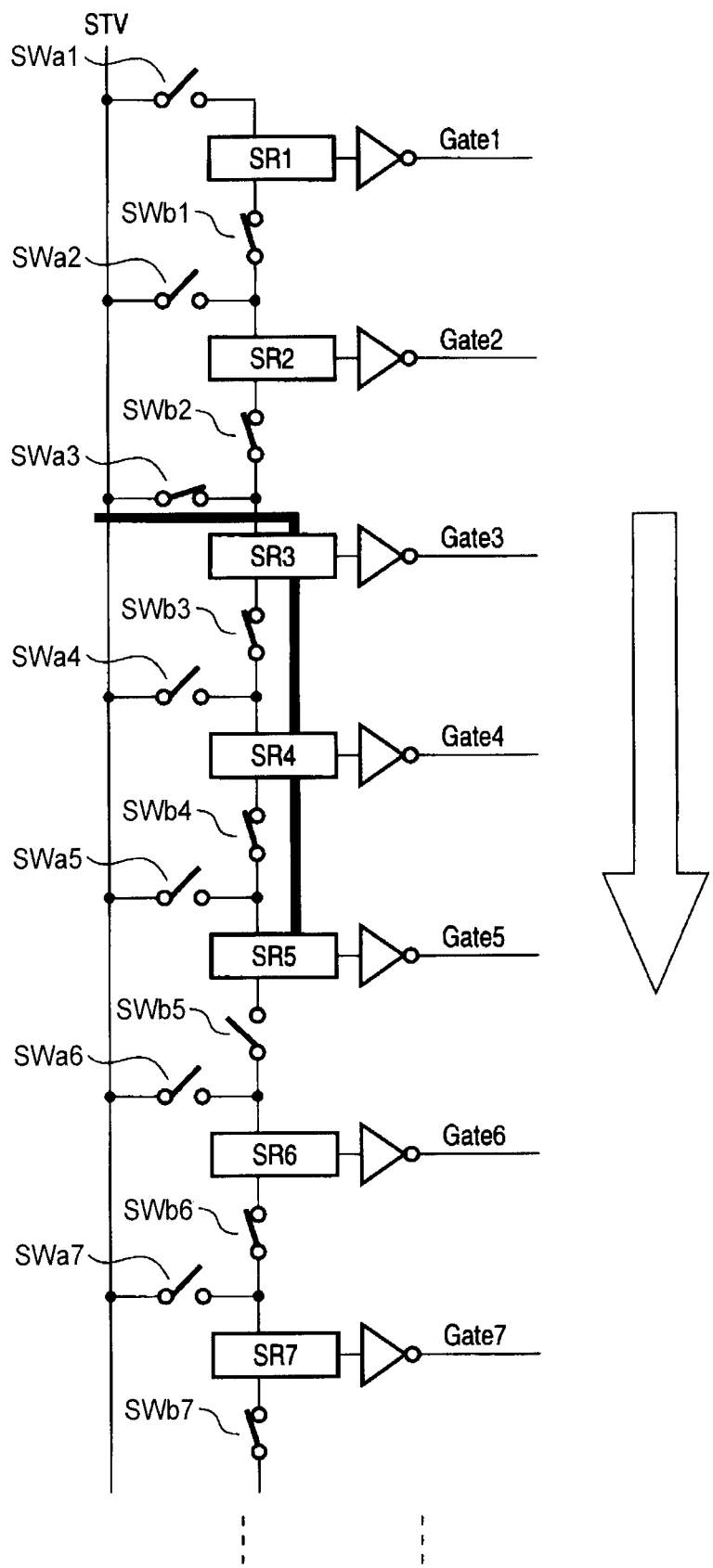
FIG. 5 is a view schematically showing a frame format of a signal connection between the decoder circuit and the gate driver when a partial area is displayed according to the first embodiment of the invention.

FIG. 5 is a schematic diagram showing a signal connection of the decoder circuit 8 and the gate driver circuit 5 when a partial area is displayed. Among the first switches (SWa1, ... ) of the decoder circuit 8, only a switch which corresponds to the start address becomes "ON" state, and the remaining first switches are "OFF" state. Here, only switch SWa3 becomes "ON" state. The second switches (SWb1 ... ) are "OFF" state (open) during an active time and "ON" state (conductive) during a non-active time in a way opposite to the operation of the first switches (SWa1, ... ). Accordingly, in the normal time, all the second switches (SWb1 ... ) are "ON" state and only one selected switch becomes "OFF" state when a gate line is selected. Therefore, the second switches SWb1~SWb4 are "ON" state and only switch SWb5 becomes "OFF" state.

The vertical start pulse STV is inputted to the shift register SR3 corresponding to the start address, and a shift operation is conducted to the shift register SR5 corresponding to the end address. Accordingly, a scan operation is made from the partial start gate line to the partial end gate line.

Figure 6:
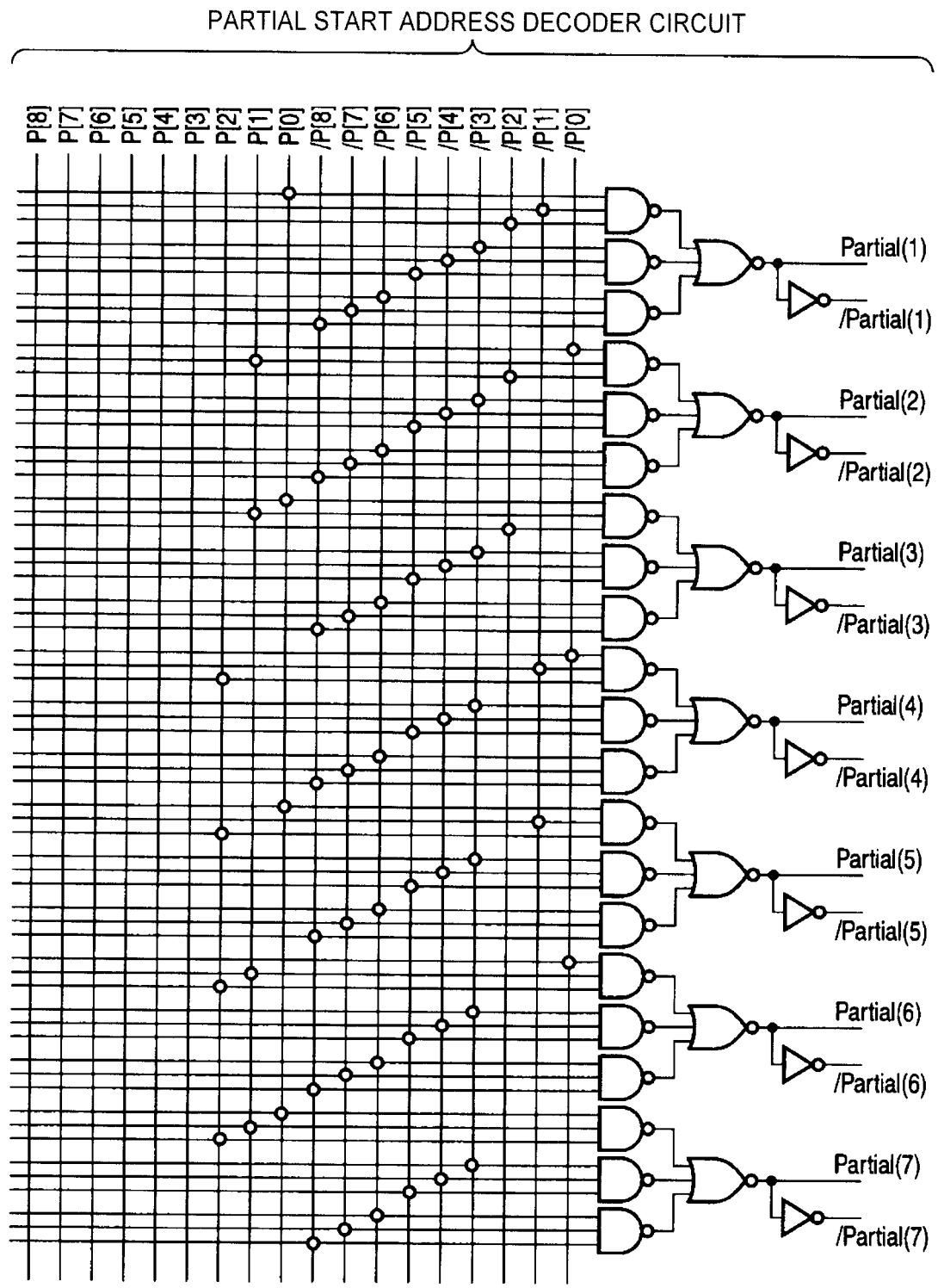
FIG. 6 is a view showing a partial start address decoder circuit in the decoder circuit employed in the first embodiment according to the invention.

FIG. 6 is a partial start address decoder circuit in the decoder circuit 8. 9-bits address signals (P[0], ... P[8]) and inverted address signals (/P[0], ... , /P[8]) are assigned to 18 address bus lines. The 18 address bus lines that show the partial start address and the partial end address are selectively connected with connection lines so that the address bus lines and the connection lines cross orthogonally and are selectively connected through contact holes shown by means of circles. Respective connection lines are connected with logic circuits, that is, AND circuits. Accordingly, the selected bits of (P[0]~P[8]) and (/P[0]~/P[8]) are inputted to 9AND circuit through contact holes. Consequently, first switch signals (Partial(1), ... ) and inverted first switch signals (/Partial(1), ... ) are obtained by the decoding operation.

Figure 7A:
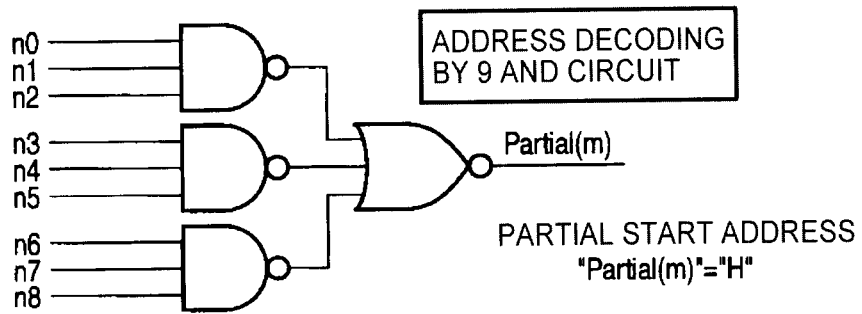
FIGS. 7A and 7B are diagrams showing an operation of a 9-input AND circuit, hereinafter called 9AND circuit, employed in the decoder circuit.
Figure 7B:
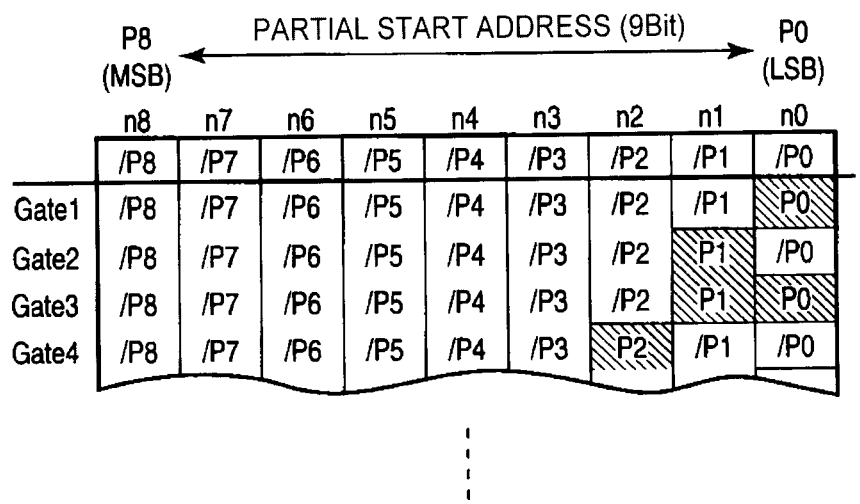

FIGS. 7(A) and 7(B) are diagrams to explain the operation of 9AND circuit. The 9AND circuit is a logic circuit in which if all the input bits (n0, ... , n8) are "1," an output signal Partial (1) is "1". When the partial start gate line is Gate 3, signals P[0]=P[1]="1" and signals P[2]= ... =P[8]="0". Further, signals /P[0]=/P[1]="0" and signals /P[2]= ... =/P[8]=1.

Accordingly, if signals P[0]=P[1]=1, signals /P[2]= ... =/P[8]=1 are selected as inputs ("1") of 9AND circuit, it is possible to set the Gate 3 in "ON" state as shown in FIG. 7B. In order to enable such decoding operation, the contact holes are assigned to each of first switch signals (Partial(1), ... ) as show in FIG. 6. For example, when the partial start address line is Gate 3, contact holes are assigned to the signals P[0]=P[1]. Similarly, contact holes are assigned to the signals /P[2]= ... =/P[8]. In this embodiment, not only the first switch signals Partial(m) but inverted first switch signals /Partial(m) are generated. The purpose to form complementary switch signals is to make a transfer gate circuit and to obtain a control signal without variations of threshold of transistors.

Figure 8:
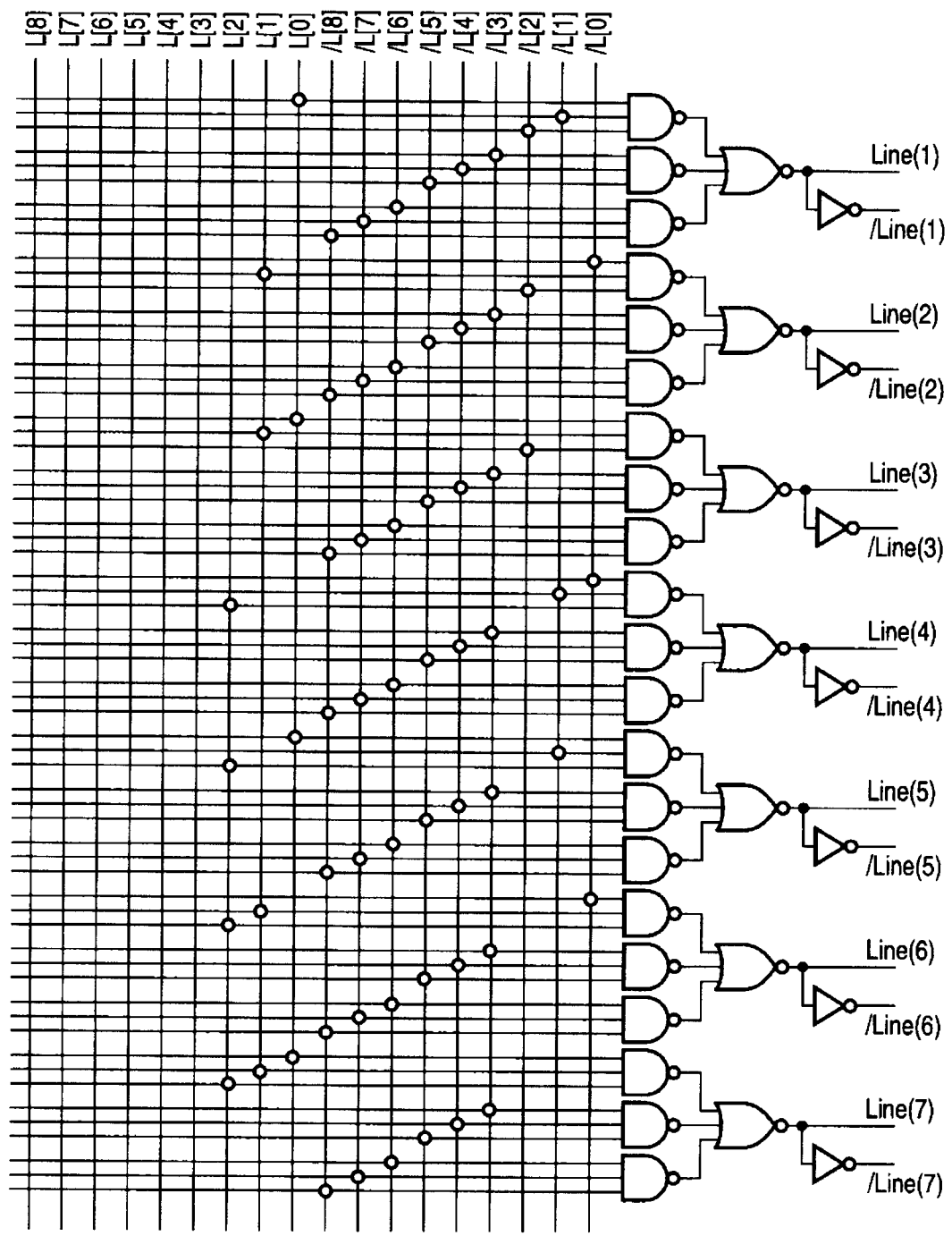
FIG. 8 is a view showing a partial end address decoder circuit in the decoder circuit according to the first embodiment in the invention.

FIG. 8 is a circuit diagram showing a partial end address decoder circuit in the decoder circuit 8. The decoder circuit 8 generates the second switch signal (Line(1), ... ) and the inverted second switch signal (/Line(1), ... ) to control the switching operation "ON" or "OFF" of the second switches. The second switch signals are formed by selectively assigning contact holes at cross points of the address bus lines and connection line as well as the partial start address decoder circuit shown in FIG. 6.

When the partial end gate line is Gate 5, signal L[0]=L[2]="1" and signal L[1]=[L3] ... =L[8]="0". Further, signal /L[0]=/L[2]="0" and signal /L[1]=/L3= ... =/L[8]=1. Accordingly, if signal L[0]=L[2]=1, signal /L[1]=/L[3] ... =/L[8]=1 are selected as input signals ("1") of 9AND circuit, it is possible to set the Gate 5 "OFF" state. In order to enable such decoding operation, the contact holes are assigned to every second switch signal (Line(1), ... ) as shown in FIG. 8. For example, when the partial end address line is Gate 5, contact holes are assigned to the signals L[0]=L[2]. Similarly, contact holes are assigned to the signals /L[1]=/L[3] ... =/L[8].

As explained above, in the decoder circuits shown in FIGS. 6 and 8, a circuit to select one gate line is elaborated by selectively arranging the locations of the contact holes to connect the address bus lines, which results in a remarkably simplified decoder circuits. In this embodiment, a width of the address bus lines is 9 bits, therefore, the decoder circuits can be applied to the display panel having the gate lines within 512 lines without changing the circuit area of the decoder circuits. When the number of the gate lines increases, if the width of the address bus lines is changed to 10 bits, it becomes possible to increase the number of the gate lines to 1024 lines. Similarly, if 11 bits are used as the width of the address bus lines, the applicable number of the gate lines are 2048. Accordingly, an increase in the circuit area accompanied with the increase of the gate lines is small and the decoder circuits are very effective to achieve a narrow frame and to adopt SOG (System On Glass) technology.

According to the above-mentioned embodiment, a partial area of the display panel may be rewritten by decoding the start address and the end address serially supplied to the decoder circuit implemented in the array substrate. Here, if the pixel PX includes a SRAM, an area other than the rewritten area may be held in the SRAM, which results in decrease in power consumption.

In this embodiment, although the SRAM is used, other memories such as a D-RAM may be used. For example, when a moving clock picture is displayed in a liquid crystal display of a mobile phone and a static picture is displayed in a remaining area, only the moving clock picture needs to be updated and it is possible to suppress power consumption.

Figure 9A:
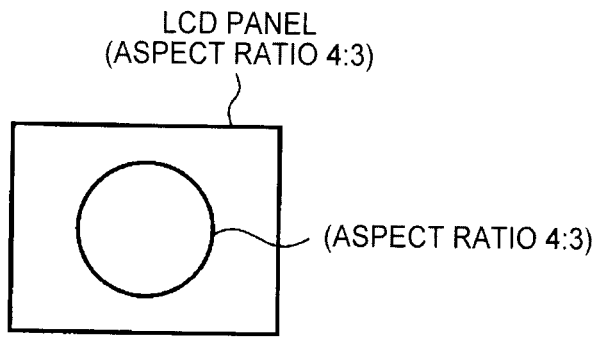
FIGS. 9A, 9B and 9C are diagrams showing an application of the invention to a letter box display.
Figure 9B:
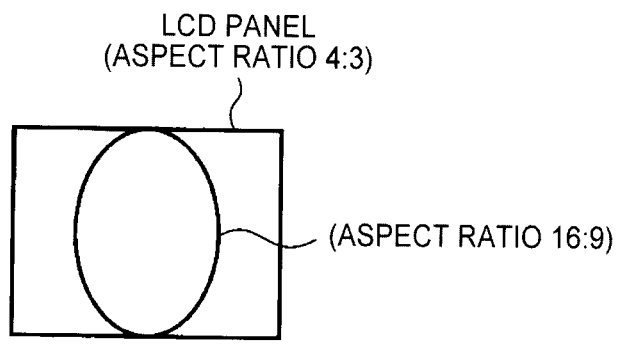
Figure 9C:
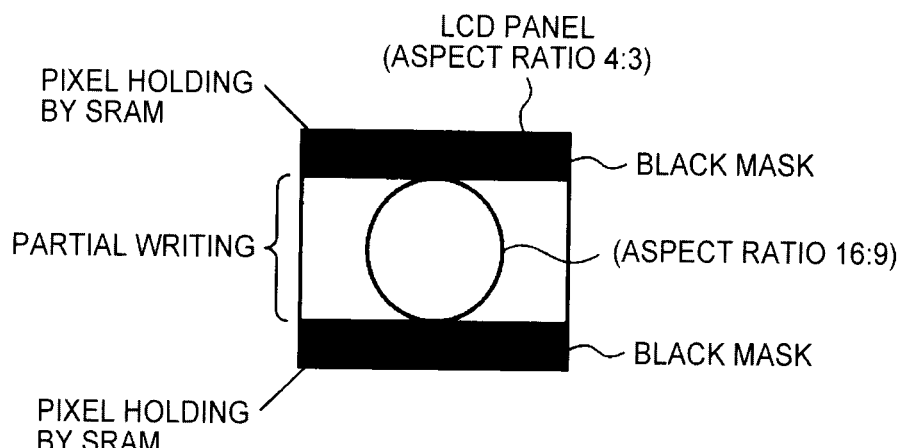

FIGS. 9A, 9B and 9C are diagrams showing an application of the invention to a letter box display. FIG. 9A shows a display in which a picture with an aspect ratio of 4:3 (NTSC standard) is displayed in a display panel of aspect ratio of 4:3 in a digital video camera (DVC) or a LCD TV. FIG. 9B shows a picture with an aspect ratio 16:9 (PAL, HD standard) in a panel of an aspect ratio 4:3. The display is unnaturally distorted. Accordingly, it is possible to prevent the impaired display by a letter box display method in which a pair of side black masks are permanently provided at upper and lower portions in the display panel and a picture is displayed other than the masked areas.

However, in the conventional liquid crystal display, it is necessary to individually correspond to different display standards such as NTSC, PAL. or HD in which the number of scan lines are different from each other. For example, an individual accommodation such as to conduct a virtual display by a thinning process or to provide a processing circuit corresponding to respective standards is required.

So far, a display device that uses two different standards has been well known. According to the above embodiment, it becomes possible to display pictures which have more than two different display standards by specifying the partial start address and the partial end address without the thinning process or an interpolating process. Accordingly, it becomes possible to easily practice the display having more than two pictures with different standards and to avoid a limitation of the number of display standards when some pictures are simultaneously displayed.

According to the present invention, following various advantages are obtained.

(1) It becomes possible to reduce a number of the control lines used in the partial display, for example, to only three lines. A compact construction can be achieved by adopting a decoder circuit for a partial display according to the invention. Consequently, it becomes possible to make the timing controller, the partial address decoder circuit and the driving circuits such as a gate driver IC for a partial display using the same process as the pixels (SOG technology) and to integrate the circuits in an array substrate.

(2) According to this invention, a partial display is enabled by specifying an arbitrary start address and an arbitrary end address. Since a partial display is possible by a simplified rewritten method, the display using more then two different standards can be easily made without using a particular hardware, the thinning process or an interpolating process.

(3) It becomes possible to suppress power consumption by combining the embodiment according to this invention and a memory such as a SRAM or a DRAM implemented in the pixel.

(4) The low power consumption technology can be used not only for mobile applications but also other applications which display text or image for very long duration of time.

The present invention is not limited directly to the above described embodiments. In practice, the structural elements can be modified without departing from the spirit of the invention. Various inventions can be made by properly combining the structural elements disclosed in the embodiments. For example, some structural elements may be omitted from all the structural elements disclosed in the embodiments. Furthermore, structural elements in different embodiments may properly be combined. It is to therefore be understand that within the scope of the appended claims, the present invention may be practiced other than as specifically disclosed herein.

What is claimed is:

1. A liquid crystal display device, comprising:
a plurality of pixels arranged on a substrate in a matrix;
a source driver circuit to supply source signals to source lines connected to each pixel arranged in a column direction;
a gate driver circuit to supply gate signals to gate lines connected to each pixels arranged in a row direction;
a control circuit to output an array control signal for a partial display;
a receiver circuit to receive a serial data including a display mode signal, a partial display start address to specify a gate line for starting a partial display and a partial display end address to specify a gate line for ending the partial display and display data; and
a decoder circuit to output a control signal to control a range of gate lines driven by the gate driver circuit, and
wherein the receiver circuit comprises a serial-parallel converter circuit including shift registers to receive a serial data and a display mode memory, a start address memory, an end address memory and display data memory connected to the serial parallel converter circuit.

2. The liquid crystal display device according to claim 1, wherein the decoder circuit includes a partial start address decoder circuit and a partial end address decoder circuit to receive a partial display start address and a partial display end address and outputs control signals to control a gate driver circuit to select the specified gate lines for the partial display.

3. The liquid crystal display device according to claim 1, wherein the decoder circuit includes partial start and partial end address decoder circuits and a plurality of first and second lines arranged in a matrix wiring pattern and contact holes formed at crossing points to selectively connect the first and second lines, and
wherein the first lines are connected to the start and end address storing memories in the receiver circuit.

4. The liquid crystal display device according to claim 3, wherein the second lines are connected to a logic circuit to output complimentary control signals.

5. The liquid crystal display device according to claim 4, wherein the decoder circuit includes a switching circuit to select gate lines for a partial display on receiving the complementary control signals.

6. The liquid crystal display device according to claim 5, wherein the gate driver circuit includes shift registers.

7. The liquid crystal display device according to claim 6, wherein the gate driver circuit includes buffer circuits connected between the shift registers and gate lines, respectively.

8. The liquid crystal display device according to claim 4, wherein the logic circuit is an AND gate circuit.

9. A method for displaying a partial picture in a liquid crystal display panel, comprising the steps of:
outputting an array control signal for a partial display to a receiver circuit;
retrieving a start gate address and an end gate address from the receiver circuit;
decoding the start gate address and the end gate address to control a range to scan gate lines corresponding to a partial display area;
selecting gate lines for the partial display by controlling switches on receiving results of the decoding; and
supplying image data to the pixels selected by the gate lines to conduct a partial display, and
wherein the retrieving step comprises using a serial-parallel converter circuit formed of shift registers to receive a serial data including the start gate address and the end gate address, and storing respective portions of the array control signal in a display mode memory, a start address memory, an end address memory and display data memory.

10. A method for displaying first and second pictures in a liquid crystal display panel, the liquid crystal display panel including a pixel memory circuit in each of the pixels, comprising:
outputting an array control signal for a partial display to a receiver circuit;
retrieving a start gate address and an end gate address from the receiver circuit;
decoding the start gate address and the end gate address to control a range to scan gate lines corresponding to a partial display area;

selecting gate lines for the partial display by controlling switches on receiving results of the decoding;

supplying image data to the pixels selected by the gate lines to conduct a partial display; and displaying the first and second pictures by different display standards having different number of gate lines.

11. The method according to claim 10, wherein the display standards are selected from NTSC, PAL and HD.

12. The method according to claim 10, wherein the start address and the end address are different depending on display standards having different number of scan lines.

13. A liquid crystal display device, comprising a plurality of pixels arranged on a substrate in a matrix;

a source driver circuit to supply source signals to source lines connected to each pixel arranged in a column direction;

a gate driver circuit to supply gate signals to gate lines connected to each pixel arranged in a row direction;

a control circuit to output an array control signal for a partial display;

a receiver circuit to receive serial data including a display mode signal, a partial display start address to specify a gate line for starting a partial display, a partial display end address to specify a gate line for ending the partial display, and display data, the receiver circuit including a serial-parallel converter circuit formed of shift registers to receive serial data, a display mode memory, a start address memory, an end address memory, and a display data memory;

a decoder circuit to output a control signal to control a range of the gate lines driven by the gate driver circuit; and a partial display control circuit to read the stored display mode signals to judge if the image data is a whole display or a partial display based on the display mode signal, and wherein when the display is a partial display, the partial start and the partial end addresses stored in the start address memory and in the end address memory respectively are respectively outputted to the decoder circuit, and when the display is a whole display, an address of a first gate line is stored in the start address memory and an address of the last gate line is stored in the end address memory to scan all the gate lines, respectively.

14. The liquid crystal display device according to claim 13, wherein the partial display control circuit modifies the input start and end addresses so as to fit to the size of the display panel and stores the modified addresses in respective of the start address and end address memories.

15. The liquid crystal display device according to claim 13, wherein the array control signal is constructed by three control signals compliant to three lines serial interface protocol (SPI: Serial Peripheral Interface).

16. The liquid crystal display device according to claim 13, wherein the pixels include a SRAM.

* * * * *